United States Patent

Kurtz

[15] 3,642,003
[45] Feb. 15, 1972

[54] SUTURES HAVING LONG-LASTING GERMICIDAL PROPERTIES

[72] Inventor: Leonard D. Kurtz, Woodmere, N.Y.
[73] Assignee: Sutures, Inc., Coventry, Conn.
[22] Filed: Aug. 26, 1969
[21] Appl. No.: 853,200

Related U.S. Application Data

[63] Continuation-in-part of Ser. No. 737,340, June 17, 1968, abandoned.

[52] U.S. Cl. .............................................. 128/335.5, 424/26
[51] Int. Cl. ........................................................ A61l 17/00
[58] Field of Search ................... 128/334, 335, 335.5; 3/1; 424/16, 25–28, 80; 117/138.5; 8/127.6, 128

[56] References Cited

UNITED STATES PATENTS

| | | | |
|---|---|---|---|
| 2,830,011 | 4/1958 | Parker et al. | 424/26 |
| 3,058,881 | 10/1962 | Wilde | 424/25 |
| 3,320,263 | 5/1967 | Wakeman et al. | 8/128 X |
| 3,388,704 | 6/1968 | Kurtz | 128/335.5 |

FOREIGN PATENTS OR APPLICATIONS

| | | | |
|---|---|---|---|
| 835,933 | 4/1952 | Germany | 128/335.5 |

Primary Examiner—Dalton L. Truluck
Attorney—Larson and Taylor

[57] ABSTRACT

Materials fabricated from fibrous proteins or other nitrogenous, amphoteric, film-forming, organic materials such as polymers, such as fibers, threads, films, yarns, fabrics and finished textile products, are provided with long-lasting germicidal properties by chemically combining germicidal ions with the nitrogenous, amphoteric, substrate. The germicidal ions are substantially incapable of being solvent extracted from the substrate which indicates that the ions have been chemically bonded thereto. For example, sutures, such as silk sutures, can be rendered germicidal for long periods of time by contacting a silk suture with an aqueous solution of a cationic or anionic germicidal surface active agent such as a germicidal quaternary ammonium salt or a germicidal organic sulfonate, to chemically bond the germicidal cation or anion of the salt to the proteinaceous substrate. The cationic or anionic germicidal agents can both be sequentially applied to the section containing both cationic and anionic germicidal ions bonded thereto.

9 Claims, No Drawings

SUTURES HAVING LONG-LASTING GERMICIDAL PROPERTIES

BACKGROUND OF THE INVENTION

This is a continuation-in-part of my copending application Ser. No. 737,340, filed June 17, 1968 now abandoned.

The present invention relates to materials such as sutures having long-lasting germicidal properties. The invention further relates to methods of providing such materials.

There have been several attempts to provide germicidal materials for general and specific use. For example, U.S. Pat. Nos. 861,231, 1,741,893 and 2,751,910 relate to the incorporation of germicides in surgical sutures. U.S. Pat. No. 1,942,061 relates to the incorporation of a germicide in a wound dressing. Other patents relate to the incorporation of germicides in textiles generally and in such specific articles as toothbrushes, diapers, blankets, clothing, paper, leather and the like. For many uses, the germicides should be tenaciously held by the substrate to prevent rapid leaching and yet the germicide cannot be so intimately held that its germicidal activity is lost. The problem in the art has been to provide feasible techniques to make such materials with long-lasting germicidal properties.

In my copending application Ser. No. 401,257, now U.S. Pat. No. 3,388,704, I have described sutures having sustained microbiocidal activity due to incorporation into the body of the suture of certain germicides introduced into the suture by means of a solvent which swelled the suture. Upon removal of the solvent, the germicides were "locked" into the suture to provide slow release. In my copending application Ser. No. 648,247, now abandoned, I described an alternative approach wherein germicides were locked into sutures and other materials by providing a substantially water insoluble precipitate of the germicide in the suture.

SUMMARY OF THE PRESENT INVENTION

According to the present invention, I have discovered that sutures and other materials of a certain type can be provided with sustained germicidal activity without the necessity of using the solvent swelling method or the precipitation method of my copending applications. I have discovered that certain substrates which can be fabricated into useful articles, can be provided with long-lasting germicidal properties by chemically combining the substrate with a germicidal material. According to the invention a nitrogenous, organic, amphoteric, film or fiber-forming substrate is contacted with an aqueous solution of a germicidal salt having at least one germicidal ion, to provide the ions in intimate association with the substrate whereby germicidal ions become chemically bonded to the substrate. The type of chemical bond formed is not known. However, the fact that chemical bonds are present is indicated by the fact that amounts of germicide picked up by the substrate in excess of a fixed amount (which depends on the substrate and the ion in question) are readily extracted by washing with water whereas amounts below that final amount are essentially nonextractable. The nature of the bond is not known. However, the bond is not extremely strong because the substrate exhibits sustained germicidal activity which is presumed to be due to the slow release of the germicidal material.

DETAILED DESCRIPTION OF THE INVENTION

The substrate which is rendered germicidal is an amphoteric, nitrogenous, organic, film- or fiber-forming material. Preferred substrates comprise film-forming fibrous proteins or organic polymers. Of the fibrous proteins, collagen and the silk protein, fibroin, are preferred. Organic polymers such as polyvinyl-pyrollidone and which are amphoteric are also suitable.

The articles treated are preferably films and textiles, including fibers, threads, yarns, fabrics, both woven and nonwoven, and the like, including finished articles such as sutures, bandages, etc. The invention is particularly suited to providing sutures of silk and collagen with long-lasting germicidal properties.

The germicidal ion which is provided in the substrate can be either a cation or an anion. The substrates according to the invention are amphoteric. That is, in their normal form they are capable of reacting with either anions or cations. The germicidal ion is provided by dissolving a germicidal salt in an aqueous solution. Suitable cationic germicidal salts are quaternary ammonium germicides and water-soluble salts of cationic antibiotics. Water-soluble quaternary ammonium germicides constitute a class of cationic salts well suited to the invention. Typical among these salts are substituted to the invention. Typical among these salts are substituted and unsubstituted alkyl dimethylbenzylammonium halides such as diisobutylphenoxyethoxyethyl dimethyl benzyl ammonium chloride (benzethonium chloride) benzalkonium chloride, lauryl-dimethylbenzylammonium chloride, cetyl-dimethyl-benzylammonium chloride, and pyridinium salts such as lauryl pyridinium halides.

The water-soluble quaternary ammonium salts may be chosen from a group of materials characterized by the formula:

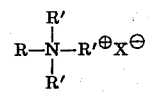

wherein x may be any anion that does not render the salt water insoluble, e.g., chloride, bromide, sulfate, etc.:

and wherein R is an aliphatic hydrocarbon chain of at least eight carbon atoms which may be part of a hereocyclic system together with other R' radicals, said hydrocarbon chains optionally being interrupted by oxygen, double bonds, nitrogen, and aromatic rings; and wherein the R' radicals are taken from the group consisting of lower alkyls of one to seven carbon atoms, aralkyl, alkenyl, alkoxy, polyalkoxy, and chloroalkyl.

Another class of high molecular weight germicidal cations can be obtained from salts of basic antibiotics. Suitable antibiotics include gentamicin and others classified as polypeptides and bases. Among the polypeptides may be mentioned bacitracin, polymyxins, tyrothricin, viomycin and vancomycin. Bases include cycloserine, tetracycline, aureomycin, terramycin, subtilin and anisomycin. The antibiotic cations are conveniently provided in aqueous solutions of the mineral acid salts of the antibiotics.

The germicidal ion may also be an anion, such as the anion of sulfonamide and derivatives thereof, salts of hexachlorophene, or other germicidal anion or the anion of an anionic surfactant or of an organic acid. Germicidal anionic surfactants include organic sulfonates such as the alkyl sodium sulfonates, aralkyl sodium sulfonates, monosulfonates of monoglycerides, sulfonates of succinic esters, etc. By "organic acid" is meant an organic compound having acidic functional groups capable of forming salts with bases such as ammonium and alkali metal hydroxides. Thus, the term includes organic compounds containing other functional groups such as hydroxy but which react with bases though the acid function to form water-soluble salts. Among the many organic acids containing a suitable germicidal anion are the acid antibiotics such as penicillins and fumagillin. The term "penicillins" as used herein means acid antibiotics which are structurally 6-substituted penicillanic acids such as Penicillins G, N, O, and V, nafcillin, methicillin, oxacillin and the like. As in the case of the cation, the anions are conveniently formed by providing an aqueous solution of the free material or water-soluble salts thereof, such as Penicillin G sodium and the like.

Suitable germicidal anionic surfactants include: germicidal alkyl sulfonates having the formula R—SO₃—X wherein R is an alkyl radical of 13 to 18 carbon atoms and X is sodium or potassium; germicidal alkaryl sulfonates having the formula R—Ar—SO₃—X wherein R is an alkyl radical of 10 to 18 carbon atoms, X is sodium or potassium, and Ar represents a divalent aromatic hydrocarbon residue; monosulfates of monoglycerides; and sulfonates of succinic acid esters. More specifically, suitable anionic surfactants include dioctyl sodium sulfosuccinate, sodium lauryl sulfate, sodium tetradecyl sulfate, sodium alkyl phenoxy sulfates, and triethanolamine salts of fatty acids such as triethanolamine lauryl sulfate.

The long-lasting germicidal ions can be readily provided in any of the nitrogenous substrate materials mentioned. The substrate is simply contacted with an aqueous solution of the germicide salt. The aqueous solution of the germicide salt. The aqueous solution may include a swelling agent which enhances impregnation into the substrate. The swelling agent may be the water of the aqueous solution, or it may be an additional ingredient such as a polar organic solvent. The solution can be heated to aid impregnation provided that the germicidal salt is not destroyed by such heat.

The germicidal ions may be provided in clothing such as diapers, in surgical dressings, and sutures which comprise, at least in part, any of the mentioned nitrogenous substrate material.

The invention is further illustrated in the examples which follow.

EXAMPLE I

A silk suture weighing about 1 gram is suspended in 100 ml. of an aqueous solution containing 20 percent by weight benzethonium chloride at room temperature. The solution is then heated to 100° C. and held there for 15 minutes. The suture is then removed from the solution and repeatedly washed with a total of several gallons of water. The thread is periodically dried and weighed and it is found the weight of the thread remains essentially constant after a few rinses and that further extensive washing with water will not reduce the weight below about 1.06 grams which represents a pickup of about 6 percent.

The sustained germicidal activity of the suture is demonstrated by placing the suture in contact with a micro-organism such as bacillus subtilus. Even after repeated washings, the area around the suture remains clear. Sustained microbiocidal activity is also demonstrated in mice. Sutures treated according to the invention implanted in mice for 5 days, for example, show no growth of organism when removed from the mice and placed in a culture medium.

EXAMPLE II

A silk suture is treated with an aqueous solution of benzalkonium chloride at room temperature and washed until the measured weight pickup is essentially constant at about 9 percent. Sustained germicidal activity is demonstrated as in Example I.

EXAMPLE III

A collagen suture is provided with about 6 percent of benzethonium similarly as in Example I, except that the collagen suture is initially preswollen in an aqueous glycerine solution. The benzenthonium is very resistant to being leached from the suture and provides sustained germicidal activity as in the previous examples.

EXAMPLE IV

A braided silk suture is swollen in hot water for 15 minutes and then immersed in a 1 percent solution of benzethonium chloride for 15 minutes at room temperature. The thread is then blotted, washed in hot water for 10 minutes and dried. The amount of benzethonium germicide calculated as about 2 percent and as very resistant to being washed out, and the suture showed sustained germicidal activity.

EXAMPLE V

A silk suture is immersed in a 10 percent aqueous solution of dioctyl sodium sulfosuccinate and washed until the pickup of the anionic surfactant was essentially constant at about 3 percent by weight. The suture showed sustained germicidal activity as in the previous examples.

As has been mentioned above, the substrate can be a textile material which can be in the form of a fiber, thread, yarn or finished article. The fiber material can be natural or synthetic. The invention is applicable to clothing, blankets and other woven and nonwoven fabrics as well as to threads and sutures and dressings and the like. In addition to the exemplified materials, the substrate may comprise other proteinacious materials and other amphoteric, nitrogenous organic polymers. The invention is particularly suited to nonabsorbable sutures and other articles fabricated from materials, such as silk, which are not absorbed by the host body.

The maximum amount of long-lasting germicidal ion provided in the substrate will vary somewhat depending on the substrate. Amounts in excess of that which will chemically combine with the substrate can be provided and are desirable where an initial high dosage of germicide is beneficial In general, the minimum amount of long-lasting germicide is largely a matter of choice, but trace amounts and amounts as low as 0.1 percent by weight based on the weight of the fiber, are effective. Although more antibacterial material can be provided in some cases, it is generally not practical to do so since lesser amounts achieve the desired persistent antibacterial action and the preferred amount of chemically combined antibacterial material is therefore between 0.1 and 15 percent by weight based on the weight of the original substrate.

The persistent germicidal activity of materials provided with insoluble germicide salts according to the invention is demonstrated by placing materials treated according to the invention, for instance as in the working examples, in contact with an organism such as bacillus subtilis. Even after repeated washings the area around a silk thread containing benzethonium, for example, will remain clear of the organism. Similarly, the persistent germicidal nature of the suture is illustrated by in vitro testings, in mice. Silk sutures treated according to the invention, for example, with benzethonium stearate, after being implanted in mice for 5 days, show no growth of organisms when removed and placed in a culture medium.

As mentioned above, the substrates to which the invention is applicable, are amphoteric. The fibroin protein of silk, for example, in its normal salt form, contains both free amine groups and free carboxyl groups. Many of these groups are undoubtedly present in salt form, the protons of the carboxyl groups having been transferred to the basic amino groups. In the presence of strong acids, however, undissociated carboxyl groups exist and, in the presence of strong bases, the amino groups are free. Hence, the proteins are amphoteric electrolytes. In the presence of acids, therefore, the proteins are in the form of acid salts which are cationic. In this form, the proteins preferentially combine with anions and it is thus preferred, in providing an anionic germicidal ion in the substrate according to the invention, to conduct the process in a medium having a pH below the isoelectric point such that the protein is present in the form of its acid salt. Similarly, in providing a cationic germicidal ion, it is preferred to conduct the process in a medium having a pH above the isoelectric point.

Where silk is the substrate, and particularly where an anionic germicide is to be provided in the silk, it is preferable to remove gum from the silk with degumming agents which can be readily washed out of the silk. Silk is conventionally degummed with soaps which include palmitates, stearates and oleates which may interfere with subsequent chemical combination of the silk and the germicidal ion. It is therefore preferred to degum the silk with a low molecular weight, highly soluble alkaline material and inorganic bases, and alkaline salts of low molecular weight organic acids having no more than 10 carbon atoms are preferred such as sodium acetate, ammonium hydroxide, etc. The suture or other substrate, such as a bandage, is conveniently sterilized subsequent to incorporation of the germicidal ion therein.

It is also contemplated to provide the substrate with ions in addition to the germicidal ions and it is also possible to provide the substrate with both cationic and anionic germicides. For example, heparin ions can be provided in a silk or other substrate according to the invention by contacting the substrate with an aqueous solution thereof. The substrate is thus provided with anticoagulant properties as well as germicidal properties similarly as in my copending application Ser. No. 648,247, now abandoned. Any combination of anionic and cationic germicides can be provided in a substrate by treating same sequentially with aqueous solutions thereof in the manner shown in the examples.

The invention is also suitable in protecting against infection during surgery. For example, any suitable substrate of the type mentioned above, in the form of a mesh or film or the like, may be used to prevent infection in closing a surgical incision by laying down one o ore layers of the treated film or mesh as the incision is closed. After suturing of the pertinoneum the exposed area is covered by a layer of treated substrate such as an absorbable collagen film or silk mesh. The fascia is next sutured in the usual manner. The exposed fascia is then covered by a layer of the treated mesh or layer is placed over the wound.

The toxicity of the germicidal anionic and cationic surface active agents is well known. Since the chemically combined materials are virtually insoluble, however, and since the gross amount of material implanted in the body in the form of a suture or wound closing mesh is quite small, toxic levels of the materials are never approached. For example, in a case requiring a total amount of suture weighing 1 gram, the maximum amount of germicide would be 150 milligrams. If this material were not chemically combined and released rapidly into the area adjacent the implant, toxic levels of the germicidal ions would not be reached. In the present invention, however, the materials are chemically combined with the substrate and are thus only very slowly released over a period of days. In general, the germicidal ions are released very slowly according to the present invention and preferably at a rate of not more than about 1 or 2 milligrams per hour. Accordingly, the concentrations of germicidal material is well below a level which would cause any problem of toxicity.

What is claimed is:

1. A surgical suture having long-lasting germicidal properties comprising a strand of a nitrogenous, amphoteric, organic film-forming material having bonded thereto both cations of an acid antibiotic and anions of a basic antibiotic.

2. The surgical suture of claim 1 wherein the basic antibiotic is selected from the group consisting of gentamicin and polymixin.

3. The surgical suture of claim 1 wherein the basic antibiotic is gentamicin.

4. The surgical suture of claim 1 wherein the basic antibiotic is polymixin.

5. The surgical suture of claim 1 wherein the acid antibiotic is penicillin.

6. The surgical suture of claim 1 wherein the penicillin is oxacillin.

7. The surgical suture of claim 1 wherein the basic antibiotic is gentamicin and the acid antibiotic is oxacillin.

8. The surgical suture of claim 1 wherein the basic antibiotic is polymixin and the acid antibiotic is oxacillin.

9. A surgical suture according to claim 1 wherein the suture is of a material selected from silk, collagen and polyvinylpyrollidone.

* * * * *